(12) United States Patent
Monte et al.

(10) Patent No.: US 8,594,682 B2
(45) Date of Patent: *Nov. 26, 2013

(54) RESOURCE ALLOCATION TO TERRESTRIAL AND SATELLITE SERVICES

(75) Inventors: Paul A. Monte, San Jose, CA (US);
Bradford W. Arnold, Camarillo, CA (US)

(73) Assignee: Globalstar, Inc., Covington, LA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/350,357

(22) Filed: Jan. 13, 2012

(65) Prior Publication Data

US 2012/0122449 A1    May 17, 2012

Related U.S. Application Data

(63) Continuation of application No. 10/463,524, filed on Jun. 18, 2003, now Pat. No. 8,121,605.

(60) Provisional application No. 60/391,997, filed on Jun. 27, 2002.

(51) Int. Cl.
*H04W 40/00* (2009.01)

(52) U.S. Cl.
CPC .................................. *H04W 40/00* (2013.01)
USPC ........................... 455/448; 455/12.1; 455/522

(58) Field of Classification Search
USPC ............. 455/522, 95, 67.11, 67.14, 427, 429, 455/430, 431, 447, 426.1, 12.1
See application file for complete search history.

(56) References Cited

U.S. PATENT DOCUMENTS

| | | | |
|---|---|---|---|
| 5,745,854 A | 4/1998 | Schorman | |
| 6,137,445 A | 10/2000 | Ha et al. | |
| 6,157,621 A | 12/2000 | Brown et al. | |
| 6,498,786 B1 | 12/2002 | Kirkbey et al. | |
| 6,606,307 B1 | 8/2003 | Cahng et al. | |
| 6,775,251 B1 | 8/2004 | Weideman et al. | |
| 6,892,068 B2 * | 5/2005 | Karabinis et al. | ............. 455/429 |

FOREIGN PATENT DOCUMENTS

GB           2357669           6/2001

* cited by examiner

*Primary Examiner* — Melur Ramakrishnaiah
(74) *Attorney, Agent, or Firm* — Jones Walker LLP (57) ABSTRACT

There is provided a method for improving an allocation of resources, i.e., frequency and power, to terrestrial services and satellite services that use a same frequency band. The method includes determining a demand ($D_S$) for a resource by users of a satellite system, determining a demand ($D_T$) for the resource by users of a terrestrial system, and allocating the resource between the satellite system and the terrestrial system based on a ratio of $D_S$ to $D_T$.

7 Claims, 5 Drawing Sheets

RESOURCE ALLOCATION TO TERRESTRIAL AND SATELLITE SERVICES

CROSS REFERENCE TO RELATED APPLICATIONS

This application is a continuation of, and claims the benefit and priority of, U.S. patent application Ser. No. 10/463,524, filed on Jun. 18, 2003 which claims priority of U.S. Provisional Patent Application Ser. No. 60/391,997, filed on Jun. 27, 2002, both of which are incorporated herein by reference in their entirety.

BACKGROUND OF THE INVENTION

1. Field of the Invention

The present invention relates an allocation of resources, i.e., frequency and power, to terrestrial services and satellite services that use a same frequency band.

2. Description of the Prior Art

A satellite radio service is a communication service in which a user employs a device that is in direct radio frequency (RF) communication with a satellite. Typically, the satellite is also in communication with a terrestrial system known as an earth station or gateway, which is, in turn, coupled to a public service telephone network (PSTN). Satellite TV service and mobile satellite service are examples of satellite radio services.

A terrestrial radio service is a communication service in which a user employs a device that is in direct RF communication with a terrestrial base station (TBS). Conventional cellular telephone service is an example of a terrestrial radio service.

Satellite radio services and terrestrial radio services currently use frequencies in two ways:

(i) They use separate frequency bands. This means that the satellite radio services use a specific frequency band and the terrestrial radio service uses a different frequency band.

(ii) When the terrestrial services use directive antennas, i.e., antennas that point the transmitted energy in a particular direction, the terrestrial service and the satellite service can use the same frequency. This can be done because the directive antennas used terrestrially put the energy at low elevation angles, i.e., along the horizon, to another directive antenna. Accordingly, the amount of energy transmitted towards a satellite in space is small, and does not ordinarily interfere with the satellite service. The satellite service has imposed on it a power flux density limit and the limit usually varies with elevation angle. At low elevation angles, the amount of power that a satellite can radiate is small. At high elevation angles, the amount of energy is larger. In this way, a satellite transmission does not interfere with the terrestrial transmission.

When the terrestrial service uses an omni-directional antenna, e.g., an antenna that transmits energy over a hemisphere, terrestrial and satellite services cannot share the same frequency bands because the two services would be prone to interfere with one another. For example, satellites do not use the same frequencies as are used with cellular services because a cellular handset has an omni type antenna.

There are four interference scenarios when satellite and terrestrial use the same frequency, particularly when the terrestrial service is mobile.

The first interference scenario is where a ground based satellite transmitter, i.e., a handset transmitting to a satellite, interferes with a receiving TBS, e.g., a cell tower. The second interference scenario is where a transmitting TBS interferes with a ground-based satellite receiver, e.g., a handset receiving from a satellite. One technique for avoiding these two types of interference is for the ground based satellite unit, e.g., the handset, to not use the same frequency as the TBS when the ground-based satellite unit is in an area near the TBS. For cellular and like services, this area is typically regarded as being within a radius of 1 to 7 kilometers from the TBS.

The third interference scenario is a satellite transmitter, in space, interfering with a terrestrial unit, e.g., a handset receiving a transmission from a TBS. A technique for avoiding this form of interference is to use a power flux density limit on the satellite.

The fourth interference scenario is a transmission from a terrestrial unit, e.g., a handset transmitting to a TBS, interfering with a satellite receiver in space. The satellite receiver could receive each terrestrial unit's transmission, especially if the terrestrial unit is using an omni-type antenna.

The satellite beam covers an area of the Earth's surface, typically 1000 to 1,000,000 square miles, but the area could be larger. In comparison a TBS beam covers a relatively smaller area of 1 to 60 square miles. However, if the TBS is located in the area covered by the beam of the satellite, then when the TBS uses a particular frequency, the satellite is denied from using that frequency in the full area covered by the satellite beam. So, for example, although the TBS covers an area of only 1 to 60 square miles, the satellite service is denied use of the frequency in an area of 1000 to 1,000,000 square miles.

DESCRIPTION OF THE INVENTION

Figure 1:
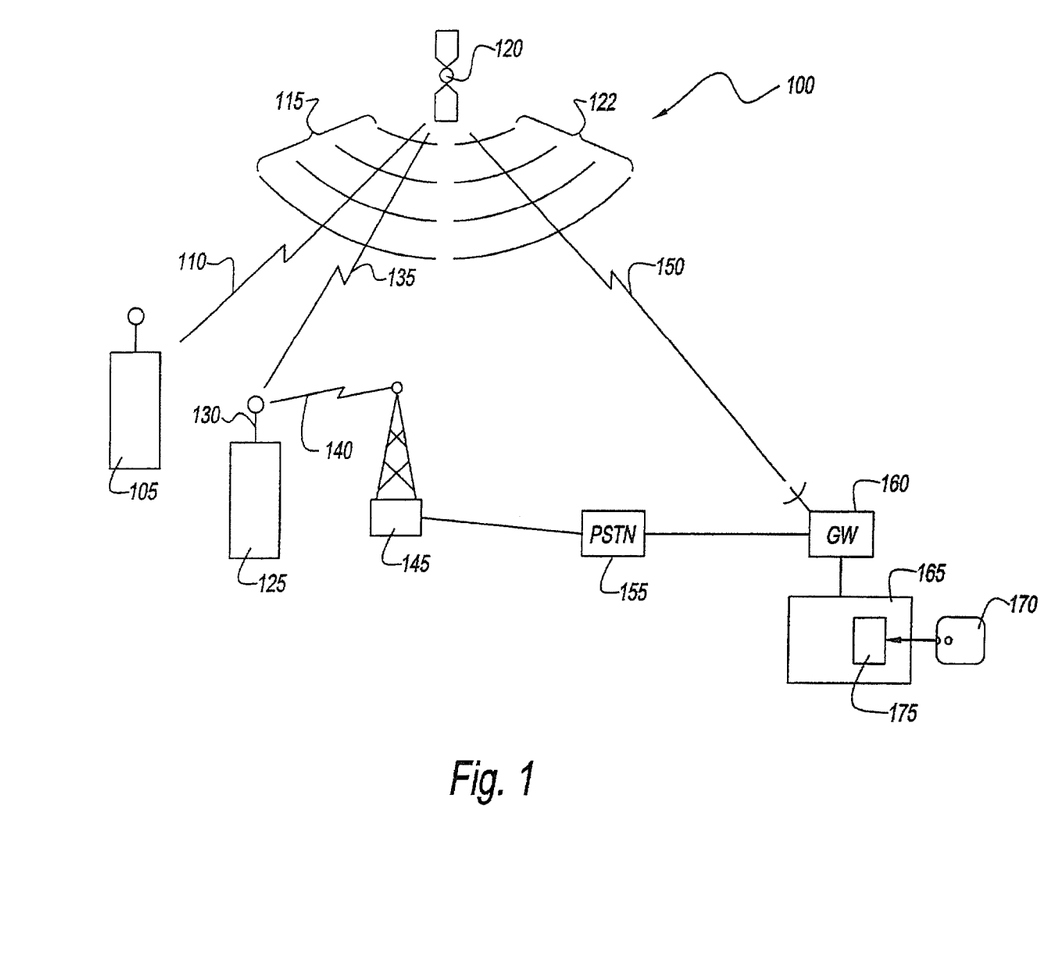
FIG. 1 is a functional illustration of a communications system that includes a satellite radio service system and a terrestrial radio service system.

FIG. 1 is a functional illustration of a communications system 100 that includes a satellite radio service system (hereinafter "the satellite system") and a terrestrial radio service system (hereinafter "the terrestrial system"). The satellite system includes a handset 105, a satellite 120 and a gateway 160. The terrestrial system includes a cell phone 125 and a cellular tower 145.

Satellite 120 has an antenna with a propagation pattern, also known as a footprint, such that a beam 115 from satellite 120 covers handset 105. Another beam 122, usually in a different frequency band, covers gateway 160. Handset 105 can be a transmitter, a receiver or a transceiver. Via an RF link 110 within beam 115, handset 105 is in direct RF communication with satellite 120, and via an RF link 150, satellite 120 is in communication with gateway 160.

Cell phone 125 has a non-directional antenna, i.e., omni-directional antenna 130. Through omni-directional antenna 130, and via an RF link 140 in a beam (not shown) of cellular tower 145, cell phone 125 is in direct RF communication with cellular tower 145.

Each of gateway 160 and cellular tower 145 are in further communication with a public service telephone network (PSTN) 155. Thus, a user of handset 105 and a user of cell phone 125 may conduct a telephone call with one another through communications system 100.

Communications system 100 also includes a processor 165 that further includes a module 175 that controls processor 165 to perform the methods described herein. Processor 165 may be configured as a special purpose processor, i.e., configured exclusively for use in communications system 100. As such, module 175 may also be implemented in hardware, as a circuit or a plurality of sub-circuits, for example, as a digital signal processor, a configuration of programmable components, or a configuration of discrete components specifically designed to provide functionality of module 175.

Alternatively, processor 165 may be implemented on a general purpose microcomputer, such as one of the members of the Sun™ Microsystems family of computer systems, one of the members of the IBM™ Personal Computer family, or any conventional work-station or graphics computer device. Although processor 165 is represented herein as a standalone processor, it is not limited to such, but instead can be coupled to other processors or computer systems (not shown).

Module 175, as an alternative to being implemented in hardware, may be implemented in software and installed in a memory device, e.g., a random access memory (RAM) or a disk memory, associated with processor 165. While module 175 is indicated as already loaded into processor 165, it may be configured on a storage media 170 for subsequent loading into processor 165. Storage media 170 can be any conventional storage media such as a magnetic tape, an optical storage media, a compact disk, or a floppy disk. Alternatively, storage media 170 can be a random access memory, or other type of electronic storage, located on a remote storage system.

Module 175, whether being implemented in hardware or software, may itself be configured as one or more subordinate modules. For example, in the software implementation, module 175 may be configured as a plurality of routines and sub-routines.

In FIG. 1, processor 165 is shown as being coupled to gateway 160. However, a processor such as processor 165 is capable of allocating resources to TBSs, gateways and satellites in a large geographic area, such as a continent. Therefore, the processor will typically be connected to one or more TBSs and one of more gateways, and therefore the satellites, in this large area. The processor can be located anywhere as long as it is connected to the TBSs and the gateways in its area of resource allocation. For example, the processor could be at a central control center or co-located at a gateway or co-located at a TBS.

Satellite 120 may be a member of a constellation of non-geosynchronous satellites. In such a constellation satellite 120, and consequently beam 115, moves with respect to the surface of the Earth, and eventually beam 115 moves so that it does not cover handset 105. However, ordinarily, another satellite (not shown) in the constellation will move into range and have a beam that covers handset 105.

Beam 115 is shown in FIG. 1 as also covering cell phone 125. Consequently, operations of cell phone 125 and satellite 120 may interfere with one another via an RF link 135. Note that RF link 135 is not a desired or intended link of communication between cell phone 125 and satellite 120, but instead represents RF interference between cell phone 125 and satellite 120.

Assuming that handset 105 includes a transmitter, it will transmit an RF signal at some power level. Similarly, cell phone 125 transmits at some RF power level. In practice, communications system 100 would have a plurality of handsets 105 and a plurality of cell phones 125 operating at any given time. Theoretically, beam 115 may receive some RF power from each of the plurality of handsets 105 and the plurality of cell phones 125.

Ordinarily, beam 115 cannot operate properly if the cumulative RF power in the same frequency band from the plurality of handsets 105 and the plurality of cell phones 125 exceeds some predetermined threshold. Thus, a total level of RF power received by beam 115 in a particular frequency band is limited. As described below, RF power and/or frequency are regarded as resources, and these resources are allocated between the satellite system and the terrestrial system to maximize the efficient utilization of the resources.

In one embodiment, module 175 (a) determines a demand (DS) for a resource by users of a satellite system, e.g., satellite 120, (b) determines a demand (DT) for the resource by users of a terrestrial system, e.g., cellular tower 145; and (c) allocates the resource between the satellite system and the terrestrial system based on a ratio of DS to DT. The resource can be either of power and frequency.

A communication system has a particular spectrum or set of spectrum bands that are available for use to it. In mobile communications, spectrum bands are typically 5 MHz to 30 MHz wide in the 1 to 3 GHz range. Depending upon the multiple access technique used, the spectrum band is divided into frequency bands. For example, a frequency band of 1.25 MHz supports between 40 and 60 simultaneous users. Therefore, if the communication system has a spectrum band of 20 MHz, the spectrum band would be divided into 16 frequency bands of 1.25 MHz.

The allocation of frequency is the allocation of these frequency bands to the gateways, and therefore the satellites, and the TBSs. If a gateway(s) and TBS(s) are allocated the same frequency band, then the amount of power (which could be represented by a number of simultaneous users) allowed in that frequency band is allocated between the gateways and TBSs.

For example, assume that there are a number of handsets 105 and a number of cell phones 125 that may potentially use a particular frequency band. Consider the ratio:

$$\frac{D_S}{D_T} = \frac{N_S \times P_S}{N_T \times P_T}$$

where:
$N_S$=number of users of satellite 120,
$P_S$=power per user of satellite 120,
$N_T$=number of users of cell tower 145, and
$P_T$=power per user of cell tower 145.

The number of users of satellite 120, e.g., the number of handsets 105, can be either a predicted number of users of satellite 120 or an actual number of users of satellite 120. A suitable representation of the power per user of satellite 120 is an average power per user of satellite 120, e.g., an average power per handset 105. Similarly, the number of users of cell tower 145, e.g., the number of cell phones 125, can be either a predicted number of users of cell tower 145 or an actual number of users of cell tower 145, and a suitable representation of the power per user is the average power per user, e.g., the average power per cell phone 125.

Assume an example with the following parameters:
$N_S=40$;
$P_S=1$ watt;
$N_T=250$; and
$P_T=0.2$ watts.
$D_S=40\times 1$ watt
$D_S=40$ watts
$D_T=250\times 0.2$ watts
$D_T=50$ watts Accordingly, RF power is allocated between satellite 120 and cellular tower 145 based on the ratio:

$$\frac{D_S}{D_T} = \frac{40 \text{ watts}}{50 \text{ watts}} = \frac{40}{50}$$

Thus, RF power will be allocated between satellite 120 and cell tower 145 using a 40/50 ratio. So, for example, if 100 watts of RF power are available for allocation in the particular frequency band:

$$\text{power allocated to satellite } 120 = \frac{40}{90} \times 100 \text{ watts} = 44.4 \text{ watts; and}$$

$$\text{power allocated to cell tower } 145 = \frac{50}{90} \times 100 \text{ watts} = 55.6 \text{ watts.}$$

Allocating a resource to a system means that the system can use an amount of the resource that is less than or equal to the allocated amount. For example, in this example, satellite 120 can use less than or equal to 44.4 watts, and cell tower 145 can use less than or equal to 55.6 watts.

Using past usage statistics of terrestrial usage and satellite usage as well as knowledge of a location of cellular tower 145, and predicted movement of beam 115, frequencies can be allocated to satellite 120 and to cellular tower 145 so that the same frequencies can be used simultaneously by both the satellite system and the terrestrial system. Also, by allocating power or a number of simultaneous calls to each of satellite 120 and cellular tower 145, satellite 120 and cellular tower 145 can share the same frequency in a general geographic region, except in portions of that region where beam 115 overlaps with the beam from cellular tower 145, e.g., the beam containing RF link 140. In addition, by considering any of the near real time data of (1) a current number of simultaneous calls being made terrestrially, (2) a number of simultaneous calls made via satellite 120 and/or (3) the amount of power or interference received by satellite 120, e.g., from RF link 135, more efficient frequency and power allocations can be made to satellite 120 and cellular tower 145.

If the number of terrestrial users in a frequency band is greater than or equal to some threshold number, then their collective RF energy level appears as noise to satellite 120, and satellite 120 is effectively denied use of the frequency band. Rather than allowing noise and interference to cause a denial of a use of frequency, module 175 evaluates the usage of the frequency by the cell tower 145 and, if appropriate, proactively denies usage of the frequency to satellite 120.

Accordingly, module 175 denies a satellite system use of a frequency band in a beam of a satellite of the satellite system if a number of users of a terrestrial system located in the beam and using the frequency band is greater than a threshold number. For example, with reference to FIG. 1, module 175 denies satellite 120 use of a frequency band in beam 115 if the number of cell phones 125 using the frequency band is greater than (or predicted to be greater than) a threshold number.

Another aspect of module 175 is that it denies a satellite system use of a frequency band in a beam of a satellite of the satellite system if a demand for a resource by users of a terrestrial system located in the beam and using the frequency band is greater than a threshold demand. For example, assume that the resource is RF power and the threshold demand is 80 watts. A suitable representation of the demand for power is found by the product of the number of users of the terrestrial system and the power per user of the terrestrial system, i.e., NT×PT. With reference to FIG. 1, module 175 denies satellite 120 use of a frequency band in beam 115 if NT×PT (i.e., of cell phones 125 located in the beam and using the frequency band) is greater than 80 watts.

The allocation of power and frequency are based on (1) the locations and beam coverages of the TBSs, e.g., cellular tower 145, (2) the predicted satellite beam coverages, e.g., the predicted coverage of beam 115, (3) the predicted satellite call traffic in a particular geographic area, and (4) the predicted terrestrial call traffic in the geographic area. The predicted satellite call traffic and the predicted terrestrial call traffic can be estimated by past usage statistics, near real-time statistics relating to the number of simultaneous callers, or satellite received power statistics.

Note that the predictions can vary with time. For example, at 2 AM, communications system 100 might not have any handsets 105 being used, and therefore, 100% of an available resource can be allocated to cell tower 145. Accordingly, module 175 is also contemplated as repeating the determination of DS, the determination of DT, and the allocation of the resource after a passage of an interval of time, for example once every hour. Thus, the resource is occasionally or periodically reallocated.

As mentioned earlier, satellite 120 may be part of a constellation of non-geosynchronous satellites. Module 175 is contemplated as repeating the determination of DS, the determination of DT, and the allocation of the resource after a positional change of the constellation. For example, when satellite 120 moves such that beam 115 no longer covers cell tower 145, and as another satellite (not shown) moves in, module 175 performs a reallocation of the resource.

Beam 115 may cover an area that includes more than one cell tower, that is, with reference to FIG. 1, beam 115 may cover other cell towers (not shown) in addition to cell tower 145. For example, beam 115 may cover Pennsylvania, which includes a cell tower in Pittsburgh and a cell tower in Philadelphia. Thus, the terrestrial system includes the cell tower in Pittsburgh and the cell tower in Philadelphia. RF power is allocated between the satellite system and the terrestrial system as in the case of the single cell tower 145, but the number of users of the terrestrial system is the total of the number of users of the cell tower in Pittsburgh plus the number of users of the cell tower in Philadelphia. Also, the amount of power allocated to the terrestrial system is further allocated between Pittsburgh and Philadelphia based on the ratio of the number of users in Pittsburgh and the number of users in Philadelphia.

Module 175 allows for the same frequencies to be used by both of satellite 120 and cellular tower 145 with either unidirectional or omni-directional antennas. Module 175 also allows for mobile terrestrial services, such as cellular telephone, to use the same frequency as mobile satellite services. Although communications system 100 is described herein in the context of a duplex communication system, the methods employed by module 175 can also be employed for simplex communication, such as a paging system. Module 175 allows for the satellite service to use a frequency that is also used by the terrestrial service in all areas except for an area relatively near, e.g., a radius of 1 to 7 km, to cellular tower 145.

An embodiment of communications system 100 is an integrated mobile satellite service (MSS)/ancillary terrestrial component (ATC) system. In the integrated MSS/ATC system, an operator uses (a) past calling statistics, (b) locations of TBSs, (c) predicted satellite beam coverages, and in near real-time (d) a number of terrestrial and MSS callers within current and upcoming beam coverages, to dynamically allocate MSS and ATC callers communications system 100, thereby maximizing co-channel sharing as desired or required.

For example, an operator using its knowledge of beam coverage by beam 115 could serve ATC and MSS loads in a single frequency channel by allocating power between the ATC and MSS loads to maximize capacity on the frequency channel at any given time depending upon the geographic distribution of both MSS and ATC call traffic. If required, an integrated MSS/ATC operator can allocate, in real time, a complete frequency channel to ATC in beam 115 with no effect on MSS or ATC capability in any other beam or frequency channel. Again, if required, an integrated MSS/ATC operator can allocate, in real time, all of one frequency channel and part of another frequency channel to ATC in beam 115 with no effect on MSS or ATC capability in any other beam or frequency channel. Furthermore, an integrated MSS/ATC operator can allocate, in real time, a complete frequency channel in beam 115 and, with loss of MSS capacity in an adjacent beam, serve many more ATC callers. Of course, if required, an integrated MSS/ATC operator could re-allocate frequency channels to MSS in full or in part. Further, the allocation of frequency channels would vary from beam to beam and within a beam over time.

Because of overlapping satellite beams, the full MSS spectrum will be available for large geographical areas without regard to how many channels are allocated to ATC. Thus, a single system operator can dynamically allocate different ATC frequencies to ATC sites, thereby allowing even larger geographical areas to be served by the full MSS spectrum.

Simultaneous, near real time knowledge of the traffic volume and interference levels of both ATC and MSS segments as well as the current and predicted near-term locations of all satellite beams enables dynamic resource allocation between MSS and ATC. An integrated MSS/ATC system could use live noise floor measurements from the satellites themselves. Based on these measurements and knowledge of MSS traffic bandwidth requirements, a feedback loop to cellular tower 145 could dynamically allocate frequency channels and traffic volumes, thus maximizing the number of ATC and MSS circuits.

A single code division multiple access (CDMA) operator can manage MSS/ATC shared bandwidth. Frequency re-use and capacity is increased by 50% relative to band split between ATC and MSS. Tests have shown improvement between 55% and 58% by beam count. The operator dynamically controls frequency assignments in order to achieve this efficiency.

Employment of a single MSS/ATC system operator allows for gains in efficiency. Additional frequency re-use is achieved when the MSS operator can dynamically assign MSS and ATC frequencies together, for example, up to another 50% re-use. Frequency allocation algorithms create these efficiencies. Quality of service also improves with a single MSS/ATC operator.

Figure 2:
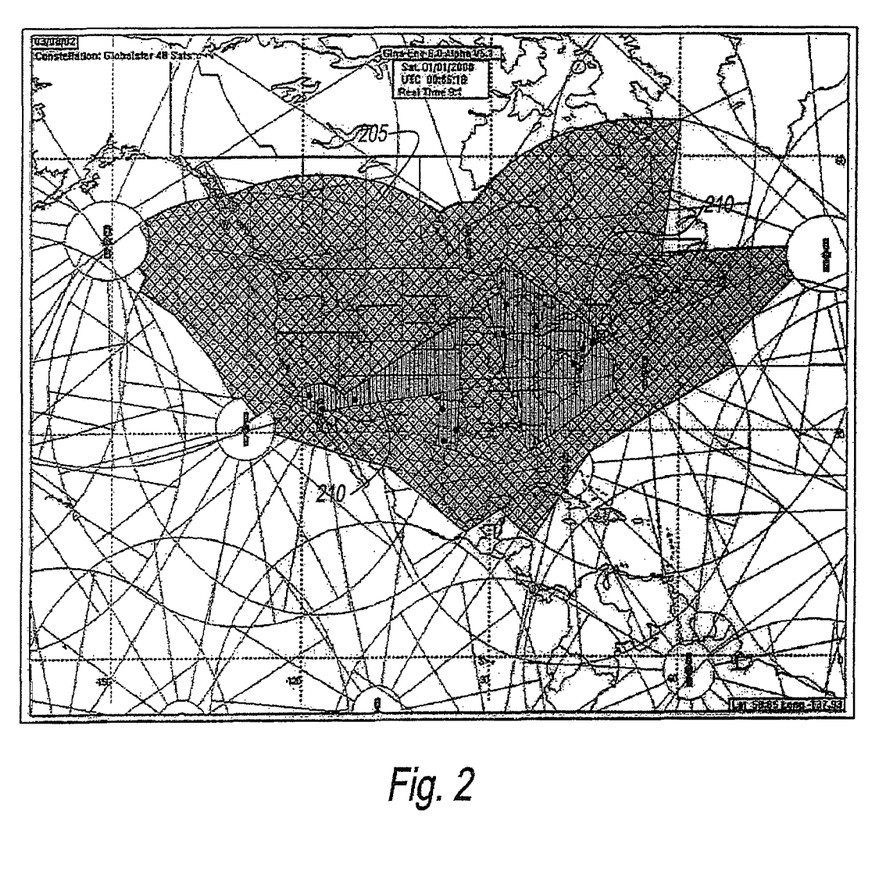
FIG. 2 is a map of the continental United States showing an example of ATC frequency interference zones in a communications system where satellite service is provided by a constellation of non-geosynchronous satellites.

FIG. 2 is a map of the continental United States showing an example of ATC frequency interference zones in a communications system where satellite service is provided by a constellation of non-geosynchronous satellites. Ten cities and Washington, D.C. are indicated by dots (•) and are assumed to have ATC services. A shaded zone 205 indicates regions with normal full-spectrum MSS beams. Shaded zones 210 indicate regions where worst case frequency interference causes lack of MSS service in ATC frequencies.

Figure 3:
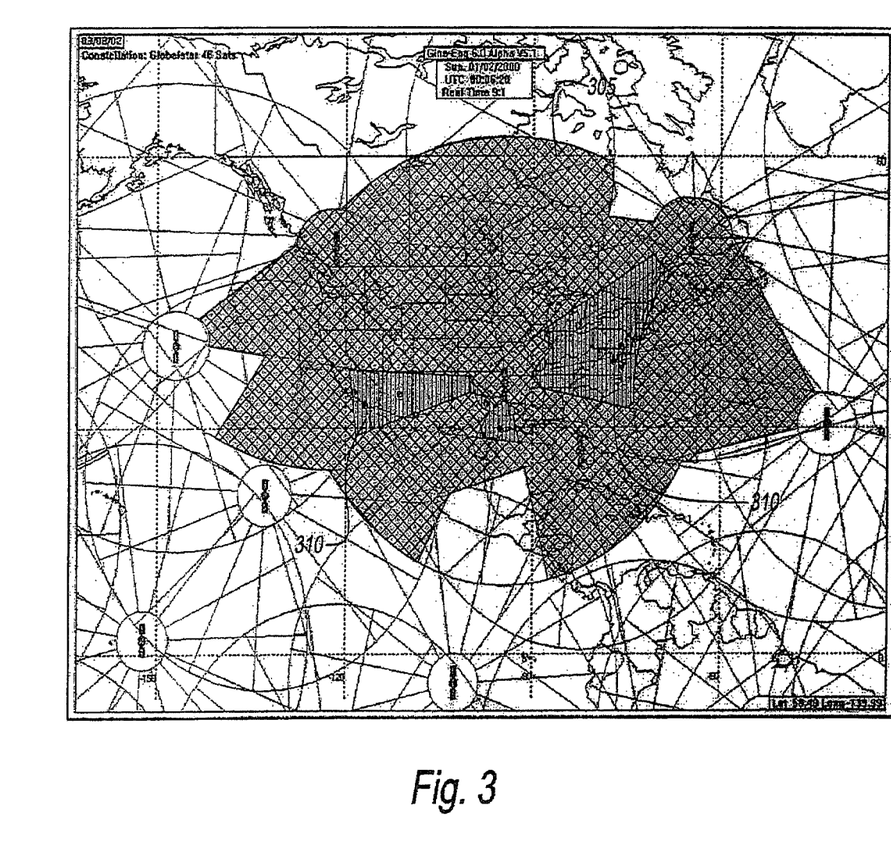
FIG. 3 is a map, similar to that of FIG. 2, showing ATC frequency interference zones for a time one day later than that of FIG. 2.

FIG. 3 is a map, similar to that of FIG. 2, showing ATC frequency interference zones for a time one day later than that of FIG. 2. With respect to the Earth, the constellation of non-geosynchronous satellites is oriented differently than in FIG. 2. A shaded zone 305 indicates regions with normal full-spectrum MSS beams. Shaded zones 310 indicate regions where worst case frequency interference causes lack of MSS service in ATC frequencies. In a comparison with FIG. 2, note that zones 305 and 310 cover different regions than zones 205 and 210, thus showing that the ATC interference zones change with the orientation of the satellites.

Figure 4:
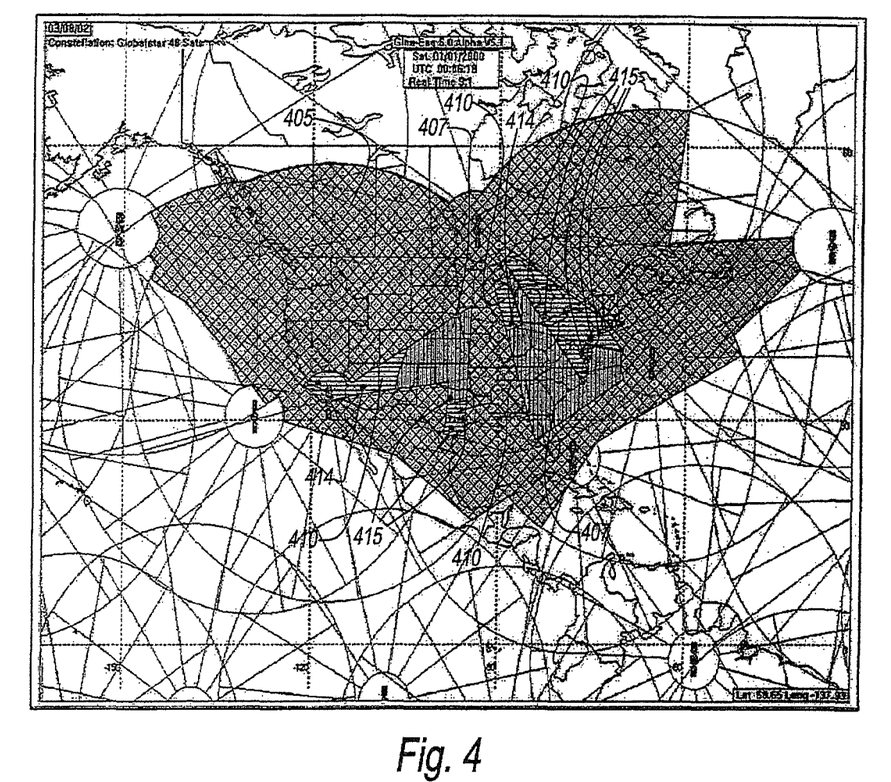
FIG. 4 is a map, similar to that of FIG. 2, showing an example of dynamic frequency assignments.

FIG. 4 is a map, similar to that of FIG. 2, showing an example of dynamic frequency assignments. In fact, FIG. 2 and FIG. 4 show the exact same situation in that the satellites are in the same place and it is the same time of day. The difference is that FIG. 4 shows dynamic frequency assignments. Shaded zones 410 indicate regions where worst case frequency interference causes lack of MS S service in ATC frequencies. Shaded zones 407 indicate regions of improvement in MSS service because with dynamic frequency assignments, the complete spectrum band is available to the MSS service. This improvement is achieved by assigning two separate frequencies, dynamically, to the ATC segments. Zones 407 have all MSS frequencies via select satellites as does zone 405, which is the same as zone 205 in FIG. 2. Separate ATC frequencies are designated for cities 414 and 415. FIG. 4 shows 50% more re-use because the number of satellite beams that do not have all MSS frequencies available when FIG. 2 is compared to FIG. 4 have been reduced by fifty percent.

Figure 5:
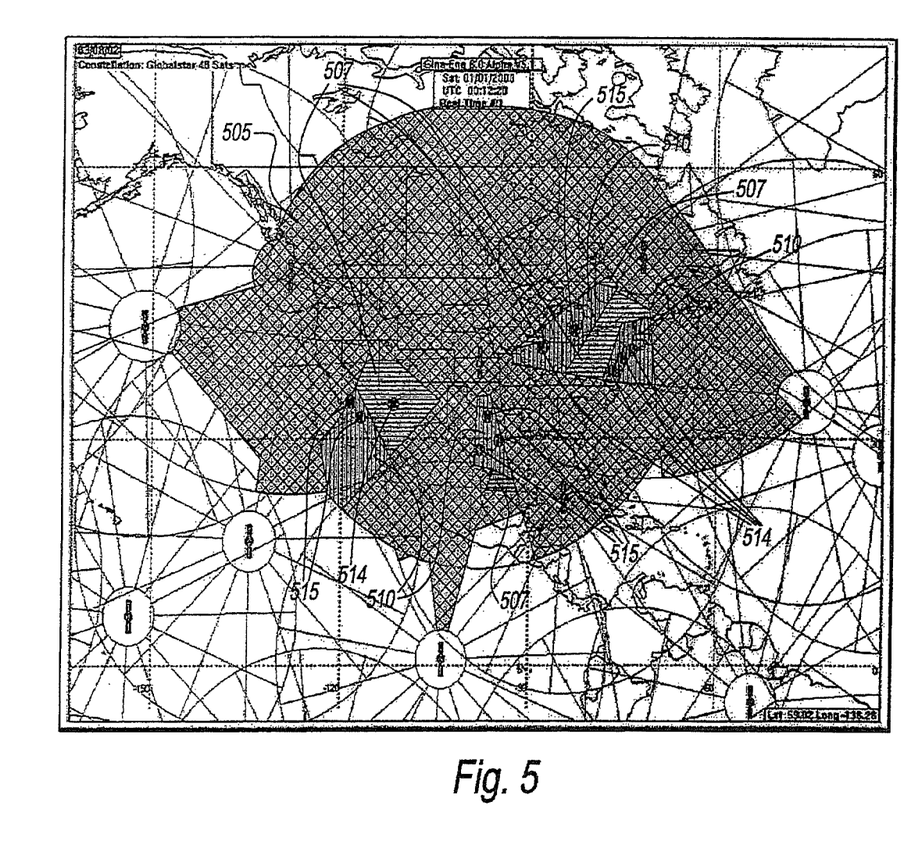
FIG. 5 is a map, similar to that of FIG. 4, showing dynamic frequency assignments at a time six minutes later than that of FIG. 4.

FIG. 5 is a map, similar to that of FIG. 4, showing dynamic frequency assignments at a time six minutes later than that of FIG. 4. Shaded zones 510 indicate regions where worst case frequency interference causes lack of MSS service in ATC frequencies. Shaded zones 507 indicate regions of improvement in MSS service by assigning two separate frequencies, dynamically, to MSS and ATC segments. Separate ATC frequencies are designated for cities 514 and 515. In a comparison with FIG. 4, note that zones 507 cover different regions than zones 407, thus showing a need for frequency coordination between MSS and ATC segments. In FIG. 5, the area where the complete MSS spectrum and power is available for satellites services is the union of areas 505 and 507.

It should be understood that various alternatives and modifications of the present invention could be devised by those skilled in the art. Nevertheless, the present invention is intended to embrace all such alternatives, modifications and variances that fall within the scope of the appended claims.

What is claimed is:

1. A method, comprising:
   determining a number of users of a terrestrial system located in a beam of a satellite and using a frequency band in said beam; and
   denying said satellite use of said frequency band in said beam if said number of users is greater than a threshold number.

2. A processor, comprising:
   a module that determines a demand (DS) for a resource by users of a satellite system;
   a module that determines a demand (DT) for said resource by users of a terrestrial system; and a module that allocates said resource between said satellite system and said terrestrial system based on a ratio of DS to DT.

3. A processor, comprising:
a module that determines a number of users of a terrestrial system located in a beam of a satellite and using a frequency band in said beam; and
a module that denies said satellite use of said frequency band in said beam if said number of users is greater than a threshold number.

4. A storage media, comprising instructions for controlling a processor to:
determine a demand (DS) for a resource by users of a satellite system;
determine a demand (DT) for said resource by users of a terrestrial system; and
allocate said resource between said satellite system and said terrestrial system based on a ratio of DS to DT.

5. A storage media, comprising instructions for controlling processor to:
determine a number of users of a terrestrial system located in beam of a satellite and using a frequency band in said beam; and
deny said satellite use of said frequency band in said beam if said number of users is greater than a threshold number.

6. A method, comprising:
determining a demand (DS) for a resource by users of a satellite system;
determining a demand (DT) for said resource by users of a terrestrial system;
allocating said resource between said satellite system and said terrestrial system based on a ratio of DS to DT; and
denying said satellite system use of a frequency band in a beam of a satellite of said satellite system if a number of users of said terrestrial system located in said beam and using said frequency band is greater than a threshold number.

7. A method, comprising:
determining a demand (DS) for a resource by users of a satellite system;
determining a demand (DT) for said resource by users of a terrestrial system;
allocating said resource between said satellite system and said terrestrial system based on a ratio of DS to DT; and
denying said satellite system use of a frequency band in a beam of a satellite of said satellite system if DT in said beam and using said frequency band is greater than a threshold demand.

* * * * *